Oct. 4, 1955　　　　W. F. RIKER　　　　2,719,345
TUBING CLAMP
Filed July 2, 1954
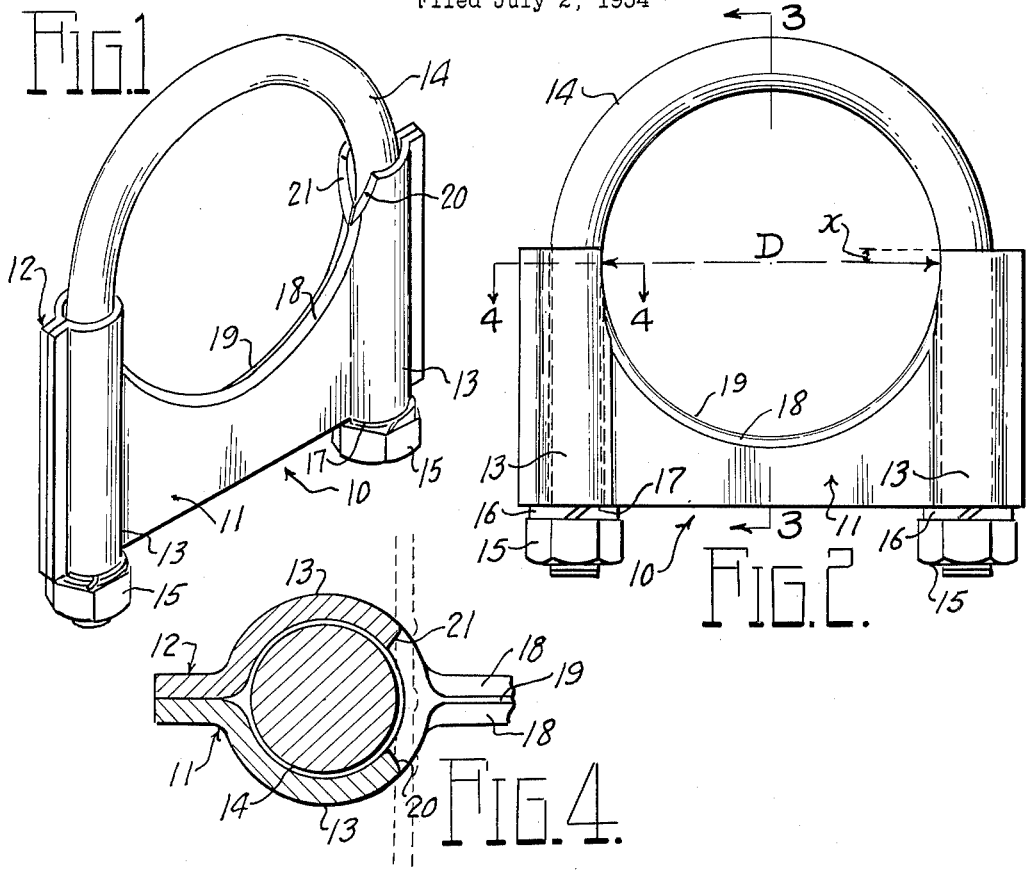
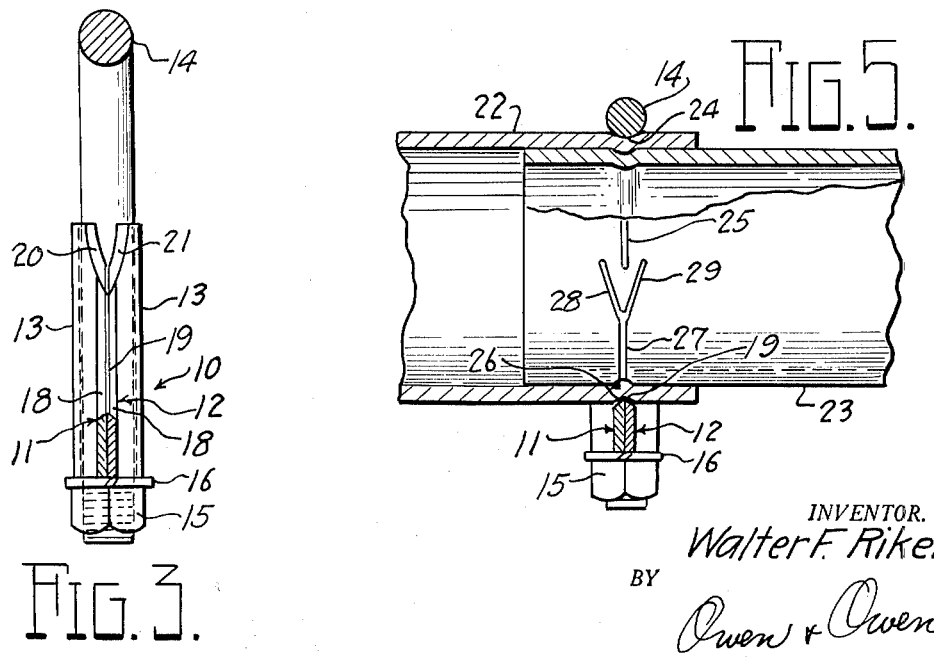
INVENTOR.
Walter F. Riker
BY
Owen & Owen
ATTORNEYS United States Patent Office 2,719,345
Patented Oct. 4, 1955

2,719,345
TUBING CLAMP

Walter F. Riker, Toledo, Ohio

Application July 2, 1954, Serial No. 440,971

4 Claims. (Cl. 24—277)

This invention relates to tubing clamps and, more particularly, to an improvement in the type of clamp generally referred to as a U-clamp which is frequently employed for sealing two sections of telescoped tubing, a hose or tubing on a pipe, a flexible, plastic or rubber hose on a nipple, or for other similar applications.

A conventional U-clamp has a semicircular base member and an inverted U shaped bolt. The arms of the inverted U usually pass through holes in the base of the semicircular base member and are threaded on their ends for the reception of tightening nuts. Various styles and types of U-clamps have been designed along these general rules but all of the prior art U-clamps have a common fault.

In order for the U-clamp to slip over the exterior of the outer hose or tubing neither of its elements can comprise more than 180° of an arc drawn on a radius usually the same as the radius of the exterior of the outer tube or hose. As the two semicircular elements are clamped together they usually are tightened to a point slightly beyond the point where the two semicircular arcs meet perfectly to form a circle or, even if they are tightened to the perfect position where the two arcs do form a perfect circle, the two arcs are being drawn together along a line perpendicular to the diameters of their open ends and there is no pressure exerted along the diameter of their open ends to squeeze the two tubes or hoses together at the sides of the clamp. Thus, for example, when two metallic telescoping tubes are to be sealed one to the other and regardless of the amount of force which is exerted by tightening the nuts of the clamp, it is virtually impossible to successfully close the lateral or side portions of the tubes at the two points where the upper ends of the semicircular clamp member meet the lower arcuate portions of the U-bolt. As a consequence, there usually remain two small, longitudinally extending, open areas through which gas can easily escape or enter and the two tubes are not perfectly sealed one to the other.

As an example of the difficulties which may be caused by this imperfect sealing of two telescoped portions of tubing, it is a well known phenomenon that heavy duty mufflers such as those employed in trucks and buses, are excessively noisy when the truck or bus is running downhill because unburned gases are exhausted from the engine and enter the muffler. Since the muffler is hot these unburned gases are exploded because of air leaks at the sides of the U-clamps clamping the tubular end of the muffler and the end of the manifold pipe together.

It is the principal object of this invention to provide an improved clamp for telescoped sections of tubing or other tubular structures which will effectively and positively seal the entire 360° circumference of the telescoped portions.

It is another object of this invention to provide a U type clamp in which the semicircular clamp element and the U-bolt overlap each other at the lateral sides when in sealing position in order to effectively provide for sealing the two telescoped sealing portions to each other around the entire circumference thereof.

The manner of the realization of these objects and other advantages of a clamp embodying the invention will be better understood from the specification which follows and from the drawings in which:

Fig. 1 is a view in perspective of a clamp embodying the invention.

Fig. 2 is a view in side elevation of the clamp shown in Fig. 1 and being illustrated in its closed or clamped position.

Fig. 3 is a vertical sectional view taken substantially along the line 3—3 of Fig. 2.

Fig. 4 is a greatly enlarged horizontal sectional view taken along the line 4—4 of Fig. 2.

Fig. 5 is a vertical sectional view with parts broken away, illustrating a pair of telescoped tubing portions with a clamp embodying the invention tightened thereon and showing the manner of effectively sealing the tubings at the overlapping portions of the clamp elements.

A clamp embodying the invention may be fabricated with its two essential opposed elements constructed in numbers of different manners. In the drawings and description which follow the precise structure of the clamping elements is only illustrative and is not intended to comprise a portion of the instant invention except as the two elements cooperate together to produce an improved clamp.

In the embodiment of the invention illustrated in the drawings a semicircular clamp body 10 is illustrated as comprising two opposed and formed plates 11 and 12. Each of the plates 11 and 12 is stamped to form a pair of spaced, parallel, semicircular offsets 13 so that when the two plates 11 and 12 are assembled in back to back relationship the two pairs of offsets 13 formed spaced parallel tubes or guides for the reception of the spaced, parallel arms of a U-bolt 14. The U-bolt 14 constitutes the other cooperating element of a clamp embodying the invention and, with the clamp body 10 forms a complete clamp. The ends of the arms of the U-bolt 14 are threaded for the reception of a pair of tightening nuts 15 which are tightened against lock washers 16 interposed between the nuts 15 and lower edges 17 of the tubular structures formed by the offsets 13.

Prior to the assembly of the two plates 11 and 12 to form the clamp body 10, and subsequent to their initial forming or stamping by which the offsets 13 are formed, each of the plates 11 and 12 is pierced in a punch to cut a semicircular lip 18 described by a radius the same as the radius of the arcuate portion of the U-bolt 14. Each of the lips 18 is beveled during the piercing operation by allowing the punch to drift slightly so that when the two plates 11 and 12 are placed in back to back relationship a relatively sharp edge 19 is formed by the two lips 18.

The clamp body 10 comprising the plates 11 and 12 has an extent greater than a mere semicircle, i. e., 180°. As can best be seen in Fig. 2, the arcuate lips 18 encompass a full 180° of a semicircle and extend vertically above and beyond a horizontal diameter indicated by the arrowed line D in Fig. 2 a considerable distance. The distance of extent beyond the diameter upwardly is indicated in Fig. 2 by a bracket and letter X connected thereto. The surfaces of the lips 18 along the portion indicated by the bracket X are not arcuate but are tangential to the arc of the remainder of the lips 18 at the points indicated by the ends of the arrows of the line D in Fig. 2.

It will also be observed that the upper inner edges of the offsets 13 of each of the plates 11 and 12 are cut away by the piercing operation to form angularly extending lips 20 and 21 on the plates 11 and 12 respectively, which meet to form a V separating from each other to embrace at their upper ends the innermost surface of the U-bolt 14.

In the embodiment of the invention illustrated the two plates 11 and 12 are formed in the same blanking, shaping and piercing dies and they are assembled in back to back relationship to form opposed structural elements of the clamp body 10. The two plates 11 and 12 may be spot welded to each other to make them structurally integral.

When the embodiment of the invention which has been described is placed around the exteriors of a pair of telescoping tubes or tube-like structures, for example two metal tubes 22 and 23 in Fig. 5, and the nuts 15 are tightened to squeeze the U-bolt 14 and clamp body 10 together around the exterior of the outer tube 22, the U-bolt 14 swages or embosses a semicircular depression indicated by the reference number 24 in Fig. 5 in the exterior of the tubing 22 and if sufficient force is applied, it similarly swages or embosses a similar area indicated by the reference number 25 in the outer surface of the inner tubing 23. The sharp edge 19 of the lips 18 on the clamp body 10 similarly depresses an arcuate, circumferentially extending area indicated by the reference number 26 in Fig. 5 in the outer tube 23 and forms a corresponding depression indicated by the reference character 27 in the outer wall of the inner tube 23. The two lips 20 and 21 depress short, angularly diverging areas indicated by the reference numbers 28 and 29, respectively, in Fig. 5 which meet the upper end of the depressed area 27 formed by the sharp edge 19, are horizontally spaced from, and vertically lap the lower ends of the depressed area 25 formed by the U-bolt 14. It is thus apparent in Fig. 5 that the inner surface of the outer tube 22 is tightly pressed against the exterior of the inner tube 23 throughout the entire 360° of their circumference. Because of the overlapping of the depressions created by the lips 20 and 21 with the depression created by the U-bolt 14 (the areas indicated by the reference numbers 28 and 29 and 25 in Fig. 5) there remains no longitudinally extending open passageway between the outer wall of the inner tube 23 and the inner wall of the outer tube 22 through which fluids can pass.

Having described the invention, I claim:

1. An external clamp for sealing telescoped metal tubes to each other, said clamp consisting of a U-bolt having a semicircular portion and parallel, spaced, tangential arms integral therewith and a saddle for said bolt, said saddle having only a single lip extending circumferentially not more than 180 degrees and an axially displaced continuation of said lip at each end thereof which extends beyond said lip and overlaps the semicircular portion of said U-bolt, the radii of said bolt and saddle being equal to the outside radius of the outer of said telescoped tubes.

2. A clamp according to claim 1 in which the single lip lies in a plane normal to the axis of the telescoped tubes and the continuations are angularly divergent therefrom.

3. A clamp according to claim 2 in which there are a pair of continuations at each end of said lip which diverge upwardly therefrom on opposite sides of the plane of said lip and overlap the ends of the semicircular portion of said U-bolt.

4. An external clamp for sealing telescoped metal tubes to each other, said clamp consisting of a planar saddle having an arcuate lip in one edge thereof and a pair of integral, spaced, parallel, tubular sections lying at opposite sides of said arcuate lip and extending generally tangentially therefrom, the inner sides of said tubular sections being cut away on a continuation of the arc of said lip at points separated less than 180 degrees around said arc, the edges of said tubular sections forming oppositely diverging continuations of said arcuate lip extending beyond 0 degrees and 180 degrees, respectively, of said arcuate lip, a U-bolt having a semicircular portion and a pair of spaced parallel, tangential arms extending through said tubular sections of said saddle, the radii of said arcuate lip and of said semicircular portion of said saddle being the same as the outside radius of the outer of said tubes, the ends of the arms of said U-bolt being threaded and extending beyond the ends of said tubular sections of said saddle, and clamping nuts threaded on the ends of said arms and bearing against the ends of said tubular sections for clamping said U-bolt and saddle around said tubes.

References Cited in the file of this patent
UNITED STATES PATENTS

| | | |
|---|---|---|
| 388,840 | Crosby | Sept. 4, 1888 |
| 1,030,151 | Baldwin | June 18, 1912 |
| 1,181,131 | Glauber | May 2, 1916 |
| 1,283,793 | Keator | Nov. 5, 1918 |
| 1,940,263 | McLaughlin | Dec. 19, 1933 |